UNITED STATES PATENT OFFICE.

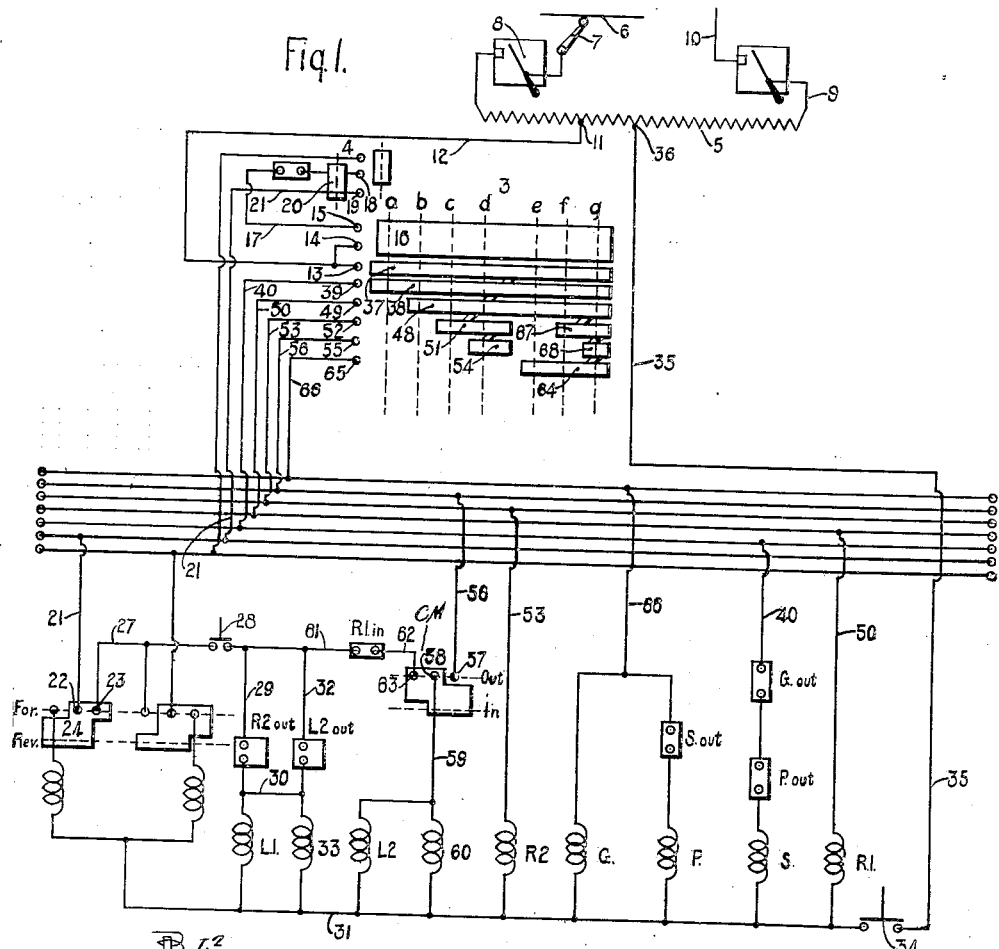
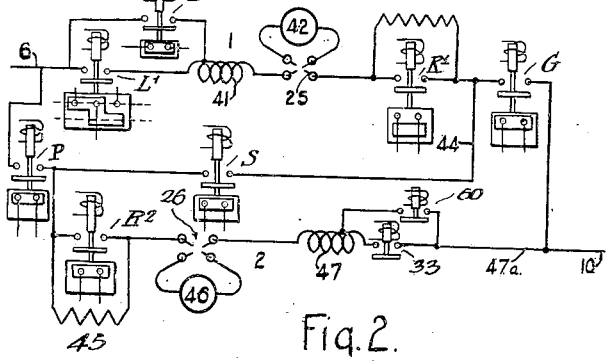

ARTHUR J. HALL AND LYNN G. RILEY, OF WILKINSBURG, PENNSYLVANIA, ASSIGNORS TO WESTINGHOUSE ELECTRIC AND MANUFACTURING COMPANY, A CORPORATION OF PENNSYLVANIA.

CONTROL SYSTEM FOR ELECTRIC MOTORS.

1,204,432.  Specification of Letters Patent.  Patented Nov. 14, 1916.

Application filed October 23, 1913. Serial No. 796,868.

*To all whom it may concern:*

Be it known that we, ARTHUR J. HALL, a subject of the King of Great Britain, and a resident of Wilkinsburg, in the county of Allegheny and State of Pennsylvania, and LYNN G. RILEY, a citizen of the United States, and a resident of Wilkinsburg, in the county of Allegheny and State of Pennsylvania, have invented a new and useful Improvement in Control Systems for Electric Motors, of which the following is a specification.

Our invention relates to control systems for electric motors, and it has special reference to systems for controlling motors that are adapted for use in electric railway and similar vehicles.

The object of our invention is to provide a system of the above-indicated character which shall be relatively simple and economical in construction and reliable and effective in operation.

With these ends in view, we have devised a control system that embodies a smaller number of main switches and fewer train lines than have been employed in systems hitherto proposed for the same service.

Our present system preferably utilizes the well-known system of field control as an auxiliary means of controlling the motor acceleration. By employing certain of the switches respectively corresponding to "full field" strength and "normal field" strength as line switches and by connecting the customary reversing switches to the armatures rather than to the field windings, as is general practice, and by reducing the number of resistance sections we have been enabled to decrease the total number of switches necessary; and, by employing a plurality of interlocking contact members in connection with the field control switches, we have found it possible, in one instance, to employ only one train line where formerly two were used.

In the accompanying drawing, Figures 1 and 2 are diagrammatic views of the control circuits and the main circuits, respectively, of a control system embodying our invention, and Fig. 3 is a chart of well-known form, showing the sequence of operation of the main-circuit switches.

Referring to the drawing, the system of control here shown comprises electric motors 1 and 2, a plurality of independently operated control switches, a master control drum 3 that is adapted to assume a plurality of motor-accelerating positions $a$ to $g$, inclusive, a control reversing switch 4, and a control resistance 5 for supplying a relatively low voltage to the control switches.

Assuming that the switch devices occupy the positions in which they are illustrated, if the control reversing switch 4 is moved to its forward running position and the master controller 3 is moved into position $a$, a circuit is established from a positive line conductor 6, through a trolley 7, a control cut-out switch 8, the control resistance 5, and a conductor 9 to the negative line conductor 10.

From an intermediate tap 11 in the control resistance, a relatively low-voltage circuit is established through a conductor 12 and control finger 13, where the circuit divides, one path including control fingers 14 and 15, which are bridged by a contact member 16, conductor 17, reversing switch fingers 18 and 19, which are bridged by a contact member 20, conductor 21, control fingers 22 and 23, which are bridged by the forward running portion of an interlocking contact member 24 of the usual type that is disposed in the control circuit connections of the main reversing switches 25 and 26, to be operated as one member in practice, circuit being continued from the control finger 23 through conductor 27, and overload trip 28, whence a parallel circuit is established, one path including conductor 29, an interlocking contact member marked "$R^2$ out" and the magnet coil of a switch $L^1$ to a conductor 31, the other path including conductor 32, an interlocking contact member marked "$L^2$ out" and the magnet coil of a switch 33 to the conductor 31, circuit being continued from this point through an overload trip 34 and a conductor 35 to a second intermediate tap 36 of the control resistance 5. A conductor 30 serves to connect the ends of the magnet coils of the switches $L^1$ and 33 that are not connected to the conductor 31. It should be noted that an interlocking contact member CM is adapted to assume an "in" or an "out" position according to the corresponding position of the switch $L^1$, in conformity with the well-known electrical interlock construction. A second circuit is connected from the control finger 13, through contact members 37 and 38, control finger 39, conductor 40, two interlocking contact members marked, respectively, "G out" and "P out" and a magnet coil of a switch S to the conductor 31, whence the circuit is completed as hereinbefore noted.

The corresponding main circuit connections may be traced as follows: from the positive conductor 6, through the switch $L^1$, a field winding 41 of motor 1, the reversing switch 25, the corresponding armature winding 42, a resistance 43 that bridges a switch $R^1$, conductor 44, switch S, a resistance 45 that bridges a switch $R^2$, the reversing switch 26, the armature winding 46 of the motor 2, the field winding 47 thereof, the switch 33, and a conductor $47^a$ to the negative line conductor 10. The motors 1 and 2, at starting, are thus disposed in series relation with the resistances 43 and 45 and severally utilized the "full field" connections.

If the master controller 3 is moved into position $b$, a contact member 48, which is connected to the energizing contact member 37, engages a control finger 49, circuit being continued from this point through a conductor 50 and the magnet coil of the switch $R^1$ to the conductor 31 and thus to the negative line conductor. In this way, the switch $R^1$ is closed, thereby short-circuiting the resistance 43. In position $c$ of the master controller, an energized contact member 51 engages a control finger 52, and a circuit is made through a conductor 53 and the magnet coil of the resistance $R^2$ to the conductor 31. The switch $R^2$ is thus closed, short-circuiting the resistance 45, whereby a straight series connection of the motors 1 and 2 across the line is obtained. Also, the interlocking contact member marked "$R^2$ out" is excluded from its control circuit, the magnet coil of switch $L^1$ being energized through conductors 32 and 30. In position $d$, an energized contact member 54 engages a control finger 55, circuit being continued from this point through a conductor 56, control fingers 57 and 58, which are bridged by the portion of the interlocking contact member CM that corresponds to the "in" position, a conductor 59 and magnet coils of switches $L^2$ and 60, disposed in parallel, to the conductor 31, and thence to the negative line conductor. Immediately upon the energization of the magnet coils of switches $L^2$ and 60, the interlocking contact member marked "$L^2$ out" is excluded from its control circuit, whereby the switches $L^1$ and 33 are opened and the interlocking contact member CM is moved to its "out" position. The circuit of conductor 56 is thus broken, but the magnet coils of switches $L^2$ and 60 remain energized by means of a connection from the conductor 27, through a conductor 61, an interlocking contact member marked "$R^1$ in," a conductor 62, and control fingers 63 and 58, which are bridged by a portion of the interlocking contact member CM that corresponds to the "out" position, to the magnet coils of the switches $L^2$ and 60. In this position of the master controller, the main circuit switches $L^2$ and 60 are closed, and the main switches $L^1$ and 33 are opened, whereby the "normal field" connections are secured on the motor and a higher speed is obtained, as will be understood.

It should be noted that, by reason of the open condition of the switch $R^1$ at starting, the interlocking contact member marked "$R^1$ in" is excluded from circuit, whereby the magnet coils of the switches $L^2$ and 60 are prevented from being energized in position $a$, as they otherwise would be through the interlocking contact member CM. In this way, it is rendered impossible to start the motors with "normal field" connection, which, as is well understood, is undesirable for starting purposes.

During the transition from position $d$ to position $e$, the contact members 51 and 54 disengage their respective control fingers whereby the switch $R^2$ is opened. A path for current to traverse the magnet coils of switches $L^1$ and 33 is thus provided through the interlocking contact member marked "$R^2$ out" and the bridging conductor 30. Upon the closure of the switches $L^1$ and 33 the interlocking contact member CM is moved to its "in" position, whereby the switches $L^2$ and 60 are opened, since the control circuits therefor are opened both at the interlocking contact member CM and at the drum contact member 54. Just before the master controller reaches the position $e$, a contact member 64 engages a control finger 65, circuit being continued from this point through conductor 66 and a magnet coil of a switch G to the conductor 31. The magnet coil of a switch P, in parallel with the coil of switch G, is not energized by reason of the exclusion from its circuit of an interlocking member marked "S out." In position $e$, the magnet coil of switch S is deenergized by reason of the closure of the switch G and the consequent exclusion of the interlocking member marked "G out" from the circuit of the magnet coil switch S. The magnet coil of switch P is thereupon energized by reason of the inclusion in its circuit of the interlocking contact member marked "S out." In the main circuit, switches $L^1$, $R^1$, G, P and 33 are closed, whereby the motors 1 and 2 are disposed in parallel relation with "full field" connections restored, the resistance 45 being included in the circuit of the motor 2. In position $f$, an energized contact member 67 engages the control finger 52, whereby the switch R² is closed and the resistance 45 is short-circuited, as already explained. In position $g$, a contact member 68 engages the control finger 55. A circuit is thus completed through the interlocking contact member CM and the magnet coils of the switches L² and 60, whereupon the switches L¹ and 33 are opened, as hereinbefore pointed out. The "normal field" motor connections are thereby established for the final motor-accelerating position. It thus appears that, at starting, the two motors, with "full field" connections, are disposed in series relation across the line, a certain resistance being included in the circuit. The resistance is gradually excluded, and then the field windings are changed over to the "normal field" connection. The motors are next disposed in parallel relation, the "full field" connections being reëstablished and a resistance being included in circuit with one of the motors. The resistance is then eliminated, and, finally, the "normal field" connections are again established.

It will be understood that modifications of the arrangement of parts and of the circuit connections herein set forth may be made within the spirit and scope of our invention. We, therefore, desire that only such limitations shall be imposed as are indicated in the appended claims.

We claim as our invention:

1. In a control system, the combination with a supply circuit and an electric motor having an armature and a field-magnet winding connected directly to one terminal thereof, of switching means for reversing the connections of the armature circuit, an electrically-controlled switch for normally connecting one side of said supply circuit to one end of said field winding, and a second electrically-controlled switch for connecting the said side of the supply circuit to an intermediate point of said field winding under predetermined conditions.

2. A control system comprising a direct-current supply circuit, an electric motor having an armature and a field-magnet winding connected directly to the positive terminal thereof, a reversing-switch for said armature, an electrically-controlled switch for connecting the positive side of said supply circuit to one end of said field winding during the greater portion of acceleration, and a second electrically-controlled switch for connecting the said side of the supply circuit to an intermediate point of said field winding to effect further acceleration of the motor.

3. A control system comprising a direct-current supply circuit, an electric motor having an armature and a field-magnet winding connected directly to the positive terminal thereof, an accelerating resistance initially connected in circuit with said motor, a reversing-switch for said armature, an electrically-controlled switch for initially, and during the greater portion of acceleration, connecting the positive side of said supply circuit to one end of said field winding, means for short-circuiting said resistance to effect predetermined motor acceleration, and a second electrically-controlled switch for subsequently connecting the said side of the supply circuit to an intermediate point of said field winding to effect further motor acceleration.

4. A control system comprising a supply circuit, a pair of electric motors adapted for series-parallel operation and severally having armatures and field windings that are respectively connected directly to non-corresponding terminals of the armatures, a pair of reversing-switches for the respective armatures, a pair of electrically-controlled switches for normally respectively connecting non-corresponding ends of the field windings to the respective sides of said supply circuit, and a second pair of electrically-controlled switches for connecting the respective sides of the supply circuit to intermediate points of the corresponding field windings, under predetermined conditions.

5. A control system comprising a direct-current supply circuit, a pair of electric motors adapted for series-parallel operation and severally having armatures and field-magnet windings that are respectively connected directly to the positive and to the negative terminal of the corresponding armatures, a plurality of accelerating resistances connected in circuit with the respective motors during initial series and initial parallel relation, a pair of reversing-switches for the respective armatures, a pair of electrically-controlled switches for initially, and during the greater portion of motor acceleration, respectively connecting the positive side of said supply circuit to one end of one field winding and connecting the negative side of the supply circuit to one end of the other field winding, means for short-circuiting said resistances to effect predetermined acceleration during both series and parallel motor operation, and a second pair of electrically-controlled switches for, subsequently to said short-circuiting, connecting the respective sides of the supply circuit to intermediate points of the corresponding field windings to effect further motor acceleration.

6. In a control system, the combination with a supply circuit and an electric motor provided with field and armature windings, of switching means for reversing the connections of the armature circuit, and a plurality of electrically operated switches for severally acting both as supply circuit switches to connect said field winding to the supply circuit and as switches for operatively connecting in circuit different amounts of said field winding to vary the motor speed.

7. In a control system, the combination with a supply circuit, of a plurality of sets of circuit-changing switching devices, a plurality of controlling circuits therefor, a controlling switch for said circuits, and means for closing the control circuit of the second set through said switch when the first set occupies a predetermined position and for automatically transferring said control circuit to connection with the control circuits of said first set when the latter occupies another position.

8. In a control system, the combination with a supply circuit and a plurality of electric motors, of a plurality of circuit-changing switches therefor including resistance-varying switches and a plurality of sets of field-changing switches, a plurality of electro-magnetic means for severally actuating said switches, a master-controller for completing the control circuits of certain of said electro-magnetic means, contact making and breaking means movable with one of said resistance-varying switches for correspondingly opening and closing a connection between the control circuits of said sets of field-changing switches, a plurality of parallel-connected contact making and breaking means respectively movable with a second resistance-varying switch and with a switch of the second of said sets for closing and opening the control circuits of the first set as the switches actuating said contact making and breaking means respectively move to their "out" and "in" positions, and an interlocking contact member movable with a switch of the first of said sets for completing the control circuit of said second set through said controller when said first set occupies the "in" position and for transferring said control circuit through said first contact making and breaking means to connection with the control circuits of said first set when the latter moves to the "out" position, subsequently to the actuation of said last contact making and breaking means.

9. In a control system, the combination with a supply circuit and a plurality of electric motors severally having armatures and field windings, of a plurality of sets of field-changing switches for the respective motors, a plurality of actuating coils for said switches, a master controller for governing the energization of said coils under predetermined conditions, and interlocking means for closing the circuit of the actuating coils of the second set through said controller when the first set occupies a predetermined position and for automatically transferring said control circuit to connection with the control circuit of the actuating coils of the first set upon occupation of another position thereby.

In testimony whereof we have hereunto subscribed our names this 17th day of October, 1913.

ARTHUR J. HALL.
LYNN G. RILEY.

Witnesses:
HART S. SIMMONS,
B. B. HINES.